United States Patent
Alber

(10) Patent No.: US 10,676,186 B2
(45) Date of Patent: Jun. 9, 2020

(54) COMPLIANT ENGINE NACELLE FOR AIRCRAFT

(71) Applicant: Sikorsky Aircraft Corporation, Stratford, CT (US)

(72) Inventor: Mark R. Alber, Milford, CT (US)

(73) Assignee: SIKORKSY AIRCRAFT CORPORATION, Stratford, CT (US)

( * ) Notice: Subject to any disclaimer, the term of this patent is extended or adjusted under 35 U.S.C. 154(b) by 427 days.

(21) Appl. No.: 15/313,504

(22) PCT Filed: May 19, 2015

(86) PCT No.: PCT/US2015/031493
§ 371 (c)(1),
(2) Date: Nov. 22, 2016

(87) PCT Pub. No.: WO2015/179346
PCT Pub. Date: Nov. 26, 2015

(65) Prior Publication Data
US 2017/0197712 A1 Jul. 13, 2017

Related U.S. Application Data

(60) Provisional application No. 62/002,252, filed on May 23, 2014.

(51) Int. Cl.
*B64D 29/02* (2006.01)
*B64C 29/00* (2006.01)
(52) U.S. Cl.
CPC .......... *B64C 29/0033* (2013.01); *B64C 29/00* (2013.01); *B64D 29/02* (2013.01)
(58) Field of Classification Search
CPC .... B64C 27/605; B64C 29/0033; B64D 29/02
(Continued)

(56) References Cited

U.S. PATENT DOCUMENTS 5,096,140 A * 3/1992 Dornier, Jr. ......... B64C 29/0033
244/12.4
6,019,578 A * 2/2000 Hager .................. B64C 11/003
244/17.23
(Continued)

FOREIGN PATENT DOCUMENTS

WO 2006069304 A2 6/2006

OTHER PUBLICATIONS

Notification of Transmittal of the International Search Report and the Written Opinion of the International Searching Authority; PCT/US2015/031493; dated Aug. 19, 2015; ISR 7 pages; WO 6 pages.

*Primary Examiner* — Richard R. Green
*Assistant Examiner* — Steven J Shur
(74) *Attorney, Agent, or Firm* — Cantor Colburn LLP

(57) ABSTRACT

An aircraft includes a fuselage and a wing extending from each lateral side of the fuselage. A nacelle is pivotably secured to each wing. The nacelle has a rotor located thereat, with the rotor having a rotor tip path plane defined by rotation of the rotor about a rotor axis of rotation. When the rotor tip path plane is changed relative to the wing, the nacelle pivots relative to the wing about a nacelle hinge axis to reduce flapping required by the rotor. A method of operating an aircraft includes changing a rotor tip path plane orientation relative to a wing of the aircraft. The rotor disposed at a nacelle, with the nacelle pivotably secured to the wing. The nacelle is pivoted relative to the wing to reduce an overall tip path plane change requirement of the rotor.

15 Claims, 5 Drawing Sheets

(58) Field of Classification Search
USPC .......................................................... 244/7 A
See application file for complete search history.

(56) References Cited

U.S. PATENT DOCUMENTS

| | | | |
|---|---|---|---|
| 6,260,793 B1 * | 7/2001 | Balayn | B64C 7/00 244/130 |
| 6,276,633 B1 * | 8/2001 | Balayn | B64C 27/12 244/56 |
| 6,607,161 B1 | 8/2003 | Krysinski et al. | |
| 6,808,140 B2 | 10/2004 | Moller | |
| 7,857,254 B2 | 12/2010 | Parks | |
| 7,871,033 B2 * | 1/2011 | Karem | B64C 27/08 244/17.23 |
| 8,287,237 B2 * | 10/2012 | Stamps | B64C 11/30 416/102 |
| 8,636,473 B2 | 1/2014 | Brunken, Jr. | |
| 2003/0094537 A1 | 5/2003 | Austen-Brown | |
| 2007/0221780 A1 | 9/2007 | Builta | |
| 2009/0256026 A1 | 10/2009 | Karem et al. | |
| 2011/0315827 A1 | 12/2011 | Collins et al. | |
| 2013/0294912 A1 | 11/2013 | Brunken, Jr. | |
| 2014/0271223 A1 * | 9/2014 | Foskey | B64C 11/14 416/245 R |

* cited by examiner

COMPLIANT ENGINE NACELLE FOR AIRCRAFT

CROSS REFERENCE TO RELATED APPLICATIONS

This application is a National Stage Application of Patent Application PCT/US2015/031493 filed on May 19, 2015, which claims the benefit of and priority to U.S. Provisional Patent Application Ser. No. 62/002,252 filed May 23, 2014, the contents of which are incorporated herein by reference.

BACKGROUND

The subject matter disclosed herein relates to vertical takeoff or landing (VTOL) aircraft, such as tilt wing aircraft or Rotor Blown Wing (RBW) aircraft. More specifically, the present disclosure relates to VTOL aircraft having cyclic rotor control.

VTOL aircraft are rotor-driven aircraft capable of transitioning between conventional wing-borne flight, also referred to as airplane mode, and rotor borne flight, also referred to as helicopter mode. In some configurations, the VTOL aircraft is a tilt wing aircraft, in which the wings and rotors mounted at the wings are rotatable relative to the fuselage. In other configurations, the VTOL aircraft is a tail-sitter aircraft, in which the fuselage, wings and rotors all rotate together to transition between airplane mode and helicopter mode. Such aircraft have increased flexibility over many other aircraft in that they are capable of vertical takeoff and/or landing and have increased maneuverability due to their ability to operate in both airplane mode and helicopter mode.

BRIEF SUMMARY

In one embodiment, an aircraft includes a fuselage and a wing extending from each lateral side of the fuselage. A nacelle is pivotably secured to each wing. The nacelle has a rotor located thereat, with the rotor having a rotor tip path plane defined by rotation of the rotor about a rotor axis of rotation. When the rotor tip path plane is changed relative to the rotor axis of rotation, the nacelle pivots relative to the wing about a nacelle hinge axis to reduce flapping required by the rotor.

Additionally or alternatively, in this or other embodiments the nacelle pivots in the desired direction to rotor tip path plane change.

Additionally or alternatively, in this or other embodiments a first rotor tip path plane of a first rotor is changed in a first direction and a second rotor tip path plane of a second rotor is changed in a second direction.

Additionally or alternatively, in this or other embodiments a first nacelle pivots in an opposite direction to a second nacelle.

Additionally or alternatively, in this or other embodiments the pivot angle is limited to between about 3-7 degrees.

Additionally or alternatively, in this or other embodiments a first rotor tip path plane of a first rotor is changed in a first direction and a second rotor tip path plane of a second rotor is changed in a similar direction.

Additionally or alternatively, in this or other embodiments a first nacelle pivots in a similar direction to a second nacelle.

Additionally or alternatively, in this or other embodiments a damper is operably connected to the wing and to the nacelle to limit a pivot angle of the nacelle relative to the wing.

Additionally or alternatively, in this or other embodiments each wing is rotatable relative to the fuselage.

Additionally or alternatively, in this or other embodiments each wing is rotatably fixed relative to the fuselage.

In another embodiment, a method of operating an aircraft includes changing a rotor tip path plane orientation relative to an axis of rotation of the rotor. The rotor disposed at a nacelle, with the nacelle pivotably secured to a wing of the aircraft. The nacelle is pivoted relative to the wing to reduce an overall tip path plane change requirement of the rotor.

Additionally or alternatively, in this or other embodiments a first rotor tip path plane of a first engine is changed in a first direction, and a second rotor tip path plane of a second engine is changed in a second direction.

Additionally or alternatively, in this or other embodiments a first nacelle is pivoted in an opposite direction to a second nacelle.

Additionally or alternatively, in this or other embodiments a first nacelle is pivoted in a similar direction to a second nacelle.

Additionally or alternatively, in this or other embodiments a pivot angle of the nacelle relative to the wing is limited.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
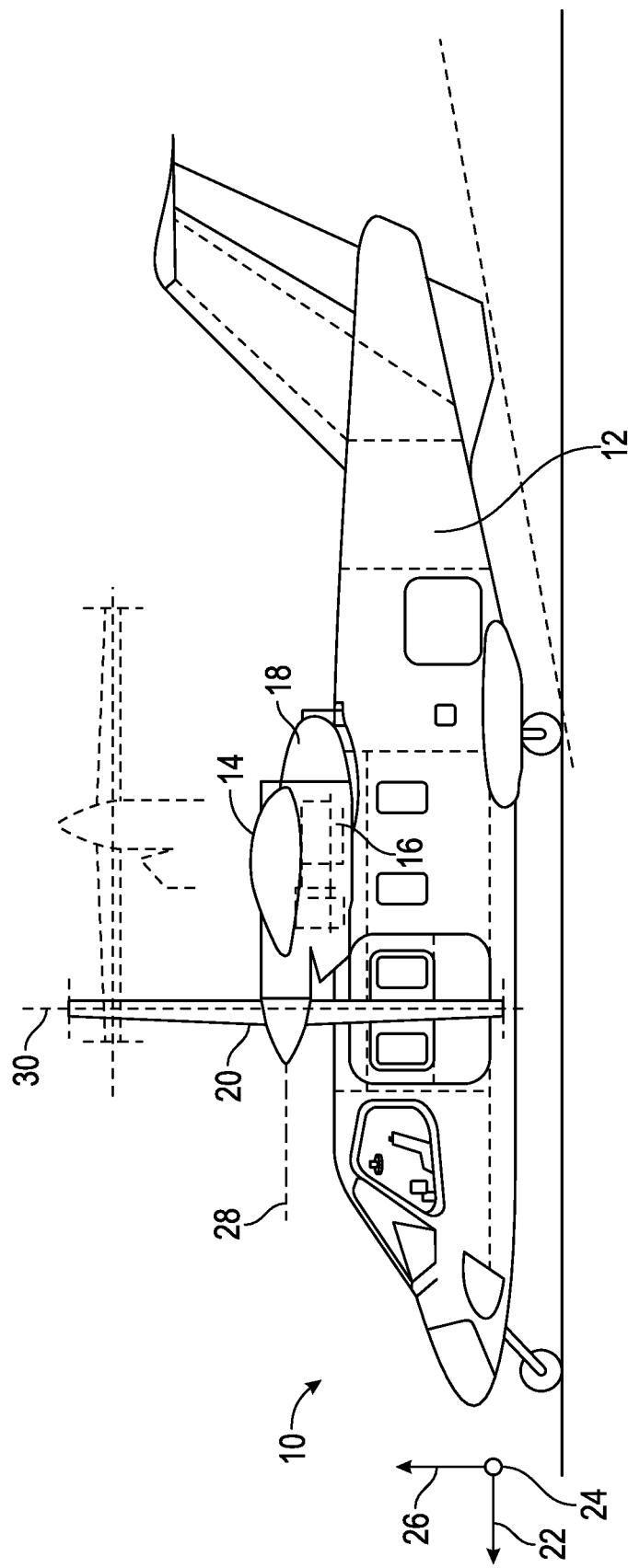
FIG. 1 is a side view of an embodiment of a tilt wing aircraft.
Figure 2:
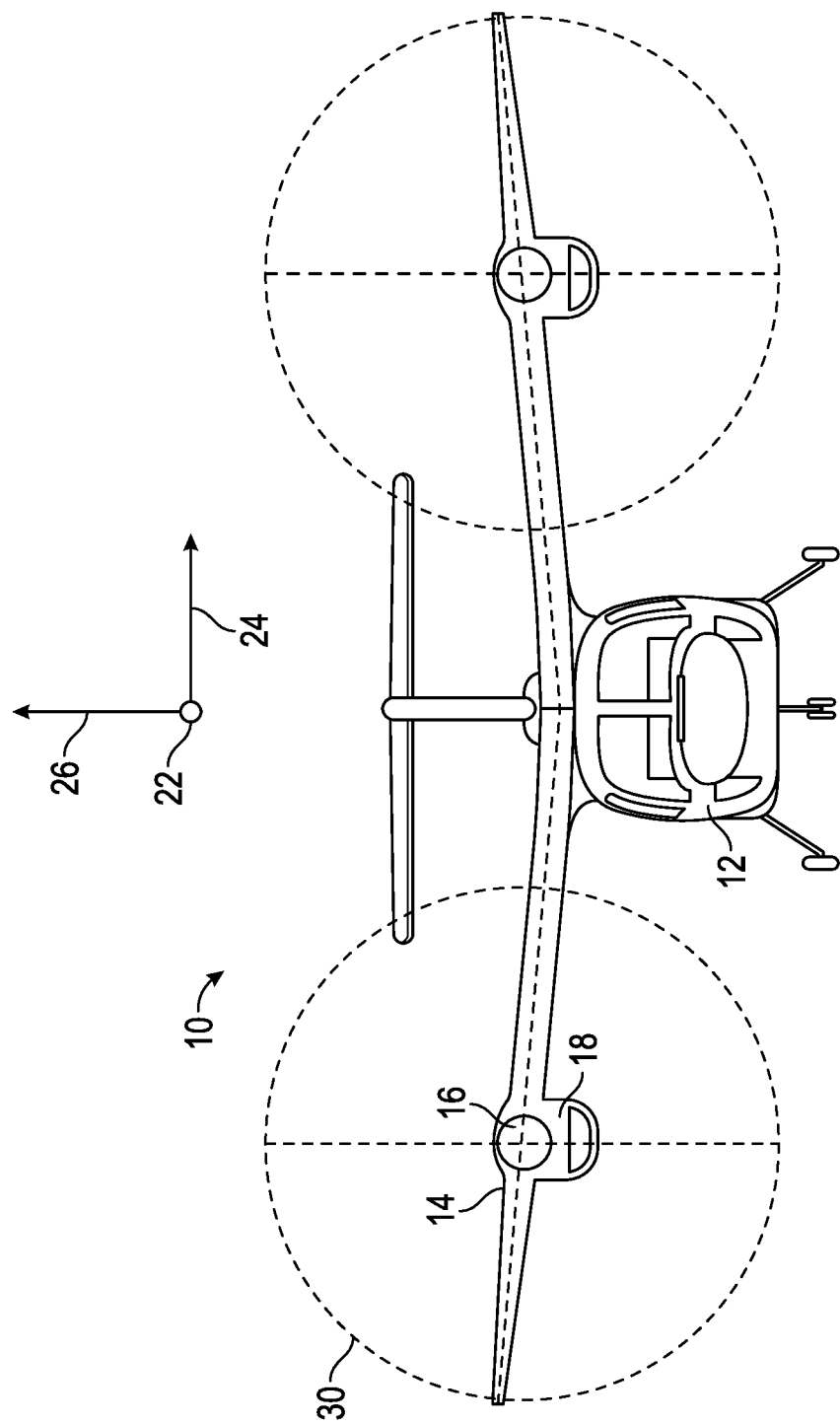
FIG. 2 is a view looking aft of an embodiment of a tilt wing aircraft in airplane mode.

Shown in FIGS. 1 and 2 is an embodiment of a tilt wing aircraft 10. The aircraft 10 includes a fuselage 12 with a wing 14 extending from each lateral side of the fuselage 12. Each wing 14 includes an engine 16 affixed thereto, contained in a nacelle 18. The engine 16 drives rotation of a rotor 20 to provide thrust and, in hover mode, lift for the aircraft 10. While the figures and description herein refer to an aircraft 10 having two engines 16, one skilled in the art will appreciate that the invention may also be applied to aircraft having other numbers of engines, for example, four engines with two at each wing. Further, while the disclosure is provided herein in the context of a tilt-wing aircraft, it is to be appreciated that aspects can readily be applied to other aircraft configurations such as rotor blown wing (RBW) aircraft or tail-sitter aircraft. As will be referenced throughout this disclosure, the aircraft 10 has a roll axis 22 extending longitudinally along the aircraft 10, a pitch axis 24 extending laterally across the aircraft 10 through the wings 14 and perpendicular to the roll axis 22, and a yaw axis 26 extending through an intersection of the pitch axis 24 and the roll axis 22, and perpendicular to both the pitch axis 24 and the roll axis 22.

Figure 3:
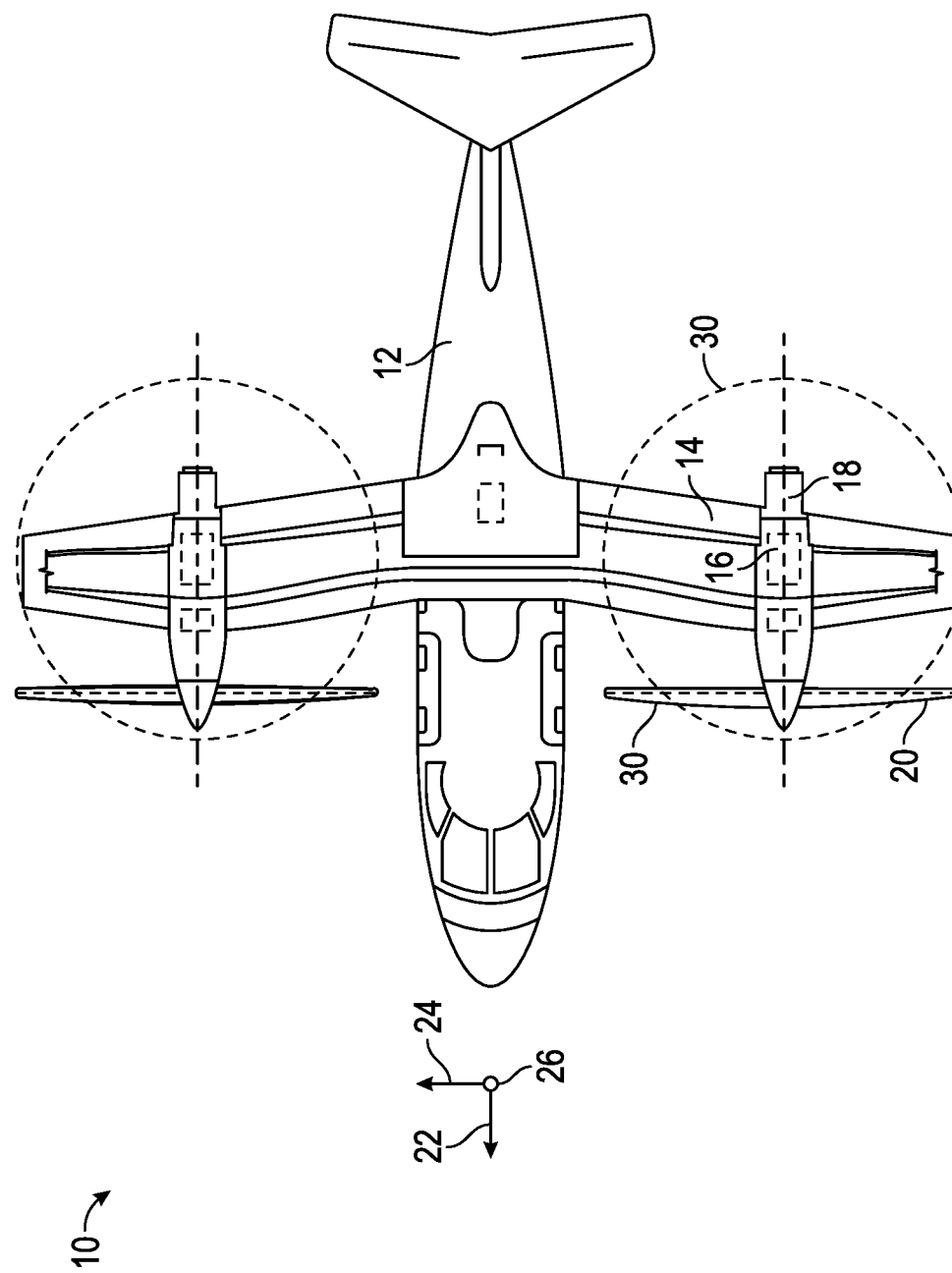
FIG. 3 is a plan view of an embodiment of a tilt wing aircraft with a helicopter mode shown partially in phantom.

The wings 14 are configured to rotate relative to the fuselage 12. In some embodiments the rotation is about the pitch axis 24. The wings 14 rotate to transition the aircraft from conventional airplane mode, shown in FIGS. 1 and 2, to hover mode, shown partially in phantom in FIG. 1 and FIG. 3 and from hover mode to airplane mode. In airplane mode, a rotor axis of rotation 28 is substantially parallel to the roll axis 22 during normal forward flight while in hover mode the rotor axis of rotation 28 is substantially parallel to the yaw axis 26. While a tilt wing configuration, in which the wings 14 rotate relative to the fuselage 12, is described herein, in other embodiments the aircraft 10 is a tail-sitter configuration, in which the wings 14 and the fuselage 12 rotate together about the pitch axis 24 between to transition between airplane mode and hover mode. When executing certain operational maneuvers, such as rotating the aircraft about a yaw axis in helicopter mode, or rotating the aircraft about a roll axis in airplane mode, rotor cyclic pitch control is utilized to execute the maneuver. Rotor cyclic pitch control tilts a rotor plane of rotation, or tip path plane (TPP), changing the angle of attack of the rotor. This change of rotor TPP can often result in rotor blade pitch change or "flapping", due to a dissymmetry of lift on the rotor.

A typical tilt wing aircraft has two rotors, one located at each wing. To execute a yaw maneuver in hover mode, cyclic pitch of a first rotor is changed in a first direction, while cyclic pitch of a second rotor is changed in a second direction opposite the first direction. Similarly opposite cyclic pitch changes are made in airplane mode to execute a roll maneuver. The wing of the tilt wing aircraft is typically configured to be torsionally stiff, to resist rotor forces acting on it. During maneuvers such as those described above, the cyclic pitch change of the rotor results in a force which tilts the nacelle in a direction creating a component of the rotor thrust force in the desired direction. The motion of the nacelle offers reduced flapping required by the rotor (i.e., pitch change of rotor blades) thereby reducing dissymmetry of lift.

Figure 4:
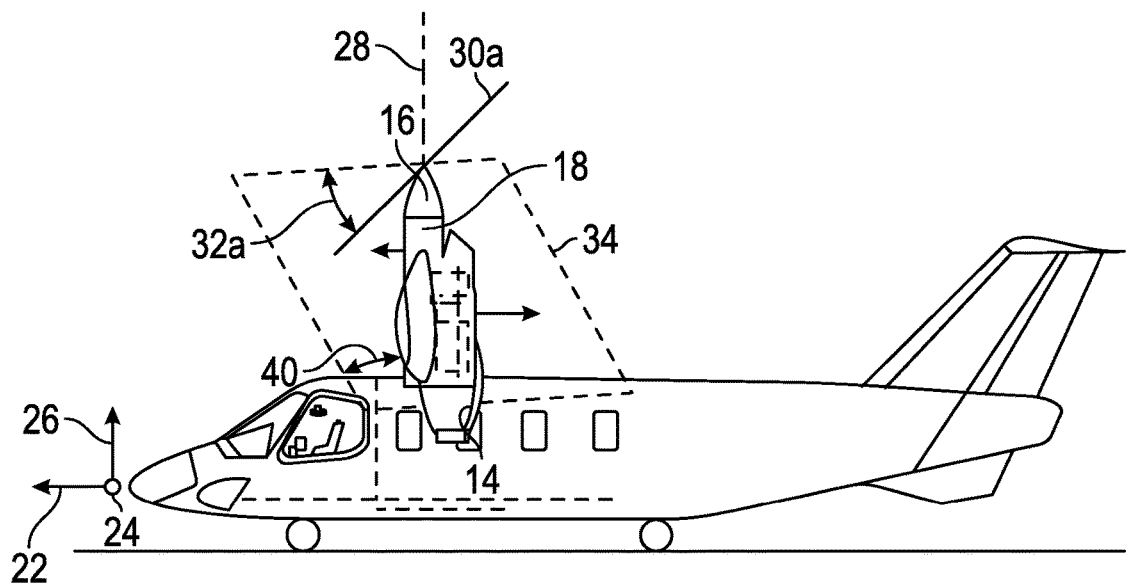
FIG. 4 is a first side view of an embodiment of a tilt wing aircraft in helicopter mode.
Figure 5:
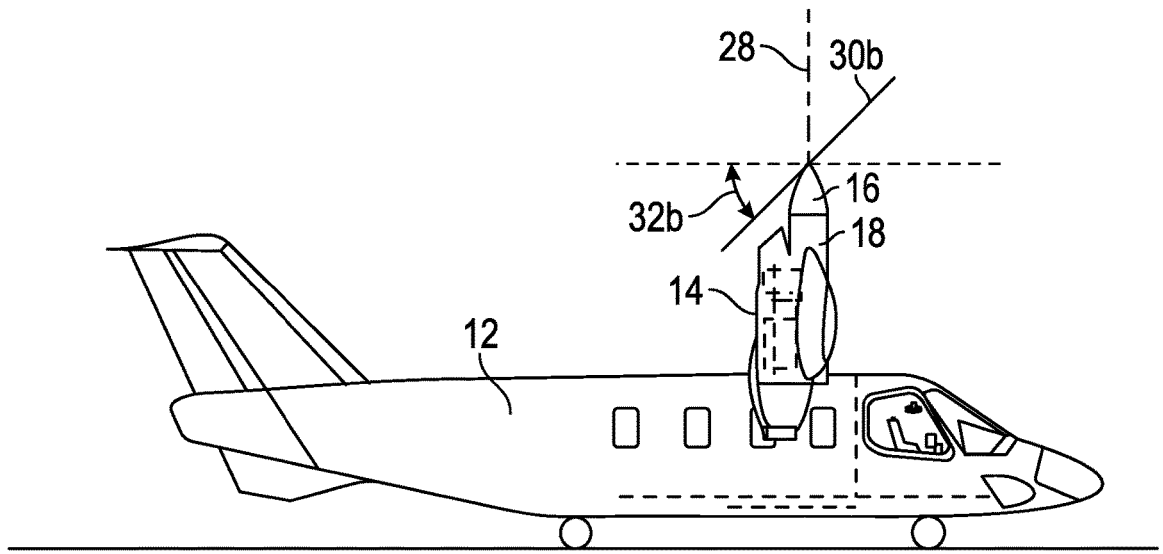
FIG. 5 is a second side view of an embodiment of a tilt wing aircraft in helicopter mode.

Referring again to FIG. 3, in normal hover flight a rotor tip path plane (TPP) 30, defined by rotation of the rotor 20 about the rotor axis of rotation 28 is substantially horizontal. To perform some maneuvers during operation of the aircraft 10, for example, rotation of the aircraft 10 about the yaw axis 26, cyclic pitch change is applied to each of the rotors 20 by a flight control system (not shown) based on pilot input. The cyclic pitch change has the effect of tilting the rotor TPP 30 in a selected direction to a selected angle relative to the wing. To yaw the aircraft 10 (view looking down on the aircraft 10 as in FIG. 3), a left side rotor TPP 30*a* is tilted to a first angle 32*a*, for example pitched downwardly (shown in FIG. 4), while a right side rotor TPP 30*b* is tilted to a second angle 32*b* (shown in FIG. 5) opposite to the first angle, for example, pitched upwardly. The result of this change in rotor TPPs 30*a*, 30*b* is that the aircraft 10 will yaw in a clockwise direction. To execute a yaw maneuver in the counterclockwise direction, the rotor TPP 30*a* and 30*b* changes are reversed.

Referring again to FIG. 4, changing the rotor TPP 30*a* results in a change to the direction of a rotor wake 34, which is perpendicular to the rotor TPP 30*a*. To provide the TPP change, the nacelle 18 attachment to the wing 14 is compliant, allowing the nacelle 18 to rotate relative to the wing 14. Rotation of the nacelle 18 relative to the wing 14 provides a thrust component in the desired direction. This reduces the flapping requirement of the rotor system.

Similarly, referring now to FIG. 1, in normal airplane flight mode, the rotor tip path plane (TPP) 30 is substantially vertical. To roll the aircraft 10 while in airplane mode, cyclic pitch change is applied to each of the rotors 20 by the flight control system 42 based on pilot input. The cyclic pitch change has the effect of tilting the rotor TPP 30 in a selected direction to a selected angle relative to the wing. To roll the aircraft 10 (view looking aft as in FIG. 2), the left side rotor TPP 30*a* is pitched downwardly to the first angle 32*a*, while the right side rotor TPP 30*b* is pitched upwardly to the second angle 32*b* opposite to the first angle, for example, pitched upwardly.

Similar to when in hover mode, changing the rotor TPP 30*a* results in a change to the direction of the rotor wake 34, which is perpendicular to the rotor TPP 30*a*. The rotor wake 34 impacts the wing 14, which generates a roll opposing force acting in a direction opposite a selected roll direction, slowing the roll rate and increasing an amount of change in the rotor TPP 30*a* to effect the selected roll. The nacelle 18 rotates relative to the wing 14 to create the amount of change to the rotor TPP 30*a*, or rotor flapping, required to effect the maneuver.

Figure 6:
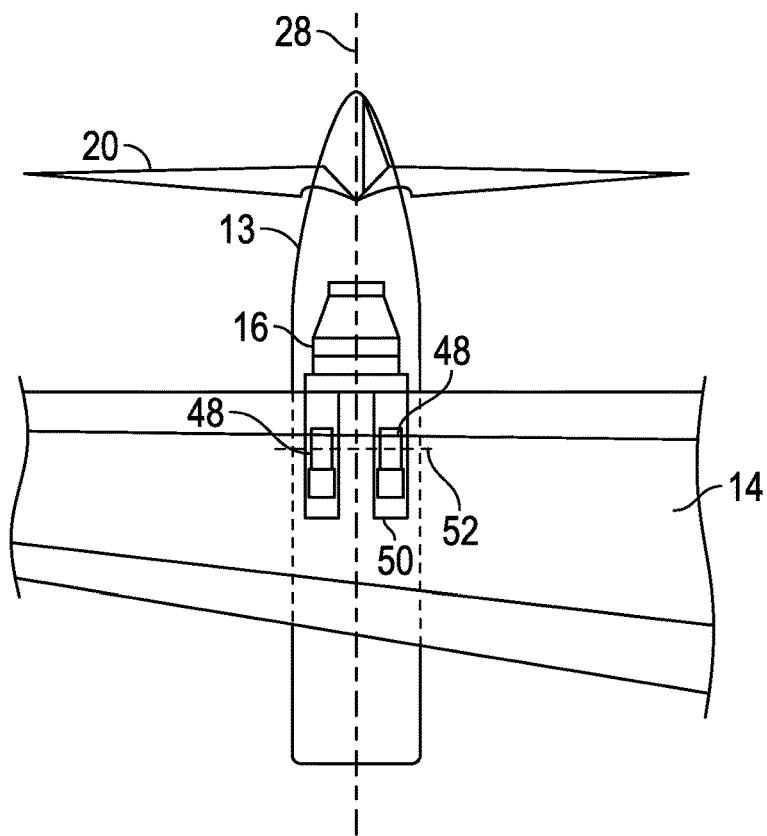
FIG. 6 is a plan view of an embodiment of a nacelle attachment to a wing.
Figure 7:
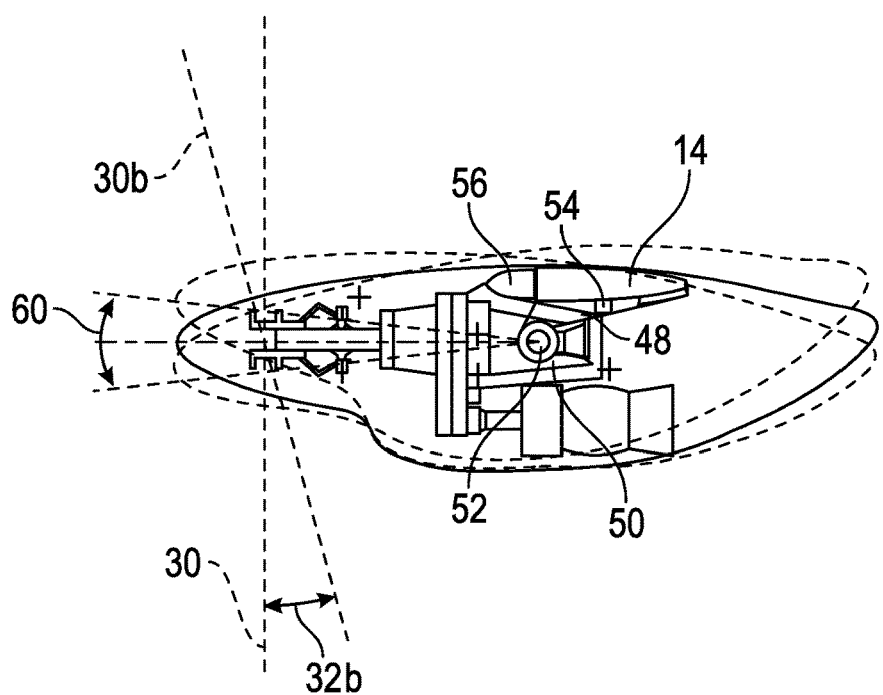
FIG. 7 is a side view of an embodiment of a nacelle attachment to a wing.

Referring to FIGS. 6 and 7, details of an exemplary embodiment of the nacelle 18 attachment to the wing 14 will be described below. Referring to FIG. 6, the structure includes a fixed wing mount 48 secured to the wing 14. In some embodiments, as shown, two fixed wing mounts 48 are utilized, one at each lateral side of the nacelle 18. The fixed wing mounts 48 connect to nacelle mount 50 of the nacelle 18, resulting in a hinged connection between the nacelle 18 and the wing 14 rotating about a nacelle hinge axis 52. Referring to FIG. 7, when the orientation of the TPP 30 is changed, the nacelle 18 rotates about the hinge axis 52 to create the TPP change. In some conditions, it is desired to limit the rotation of the nacelle 18 relative to the wing 14. For example, at engine startup it may be desired to lock the nacelle 18 in position. To lock the nacelle 18 position, the nacelle 18 includes a retractable snubber bearing 54, which is then retracted after startup to allow for rotation of the nacelle 18. Further, in some embodiments, the arrangement includes a damper 56 connecting the fixed wing mount 48 to the nacelle mount 50 to limit the amount of rotation of the nacelle 18. Limiting rotation of the nacelle 18 via the damper 56 allows for rotation of the nacelle 18, while preventing overrotation of the nacelle 18, which could lead to vibration of the nacelle 18 and thus the aircraft 10. In some embodiments, the damper 56 limits a rotation angle 60 of the nacelle 18 to between about 3-7 degrees.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, while described in the context of aircraft, it is understood that aspects could be used in other fluid media in addition to or instead of air, such as in underwater craft using propellers.

Further, while shown as being manned, it is understood that aspects could be used in unmanned aircraft. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An aircraft comprising:
   a fuselage;
   a wing extending from each lateral side of the fuselage, the wing including a pressure side surface and a suction side surface;
   a fixed wing mount connected to one of the pressure side surface and the suction side surface; and
   a nacelle having a nacelle mount coupled to the fixed wing mount, the nacelle mount and the fixed wing mount defining a nacelle hinge axis, the nacelle having a rotor disposed thereat, the rotor being tiltable relative to the nacelle and having a rotor tip path plane defined by rotation of the rotor about a rotor axis of rotation,
   wherein when the rotor tip path plane is changed relative to the wing, the nacelle pivots relative to the wing about the nacelle hinge axis to reduce flapping required by the rotor.

2. The aircraft of claim 1, wherein the nacelle pivots in a desired direction to change the rotor tip path plane.

3. The aircraft of claim 1, wherein a first rotor tip path plane of a first rotor is changed in a first direction and a second rotor tip path plane of a second rotor is changed in a second direction different than the first direction.

4. The aircraft of claim 3, wherein a first nacelle pivots in an opposite direction to a second nacelle.

5. The aircraft of claim 4, wherein a pivot angle of the first and second nacelles is limited to between about 3-7 degrees.

6. The aircraft of claim 1, wherein a first rotor tip path plane of a first rotor is changed in a first direction and a second rotor tip path plane of a second rotor is changed in a similar direction as the first direction.

7. The aircraft of claim 6, wherein a first nacelle pivots in a similar direction to a second nacelle.

8. The aircraft of claim 1, further comprising a damper operably connected to the wing and to the nacelle to limit a pivot angle of the nacelle relative to the wing.

9. The aircraft of claim 1, wherein each wing is rotatable relative to the fuselage.

10. The aircraft of claim 1, wherein each wing is rotatably fixed relative to the fuselage.

11. A method of operating an aircraft comprising:
    changing a rotor tip path plane orientation of a rotor relative to a wing of the aircraft, the rotor being tiltable relative to a nacelle, the nacelle having a nacelle mount pivotably secured to a fixed wing mount coupled to one of a pressure side surface and a suction side surface of the wing; and
    pivoting the nacelle about a nacelle hinge axis defined by the fixed wing mount and the nacelle mount relative to the wing to reduce an overall tip path plane change requirement of the rotor.

12. The method of claim 11, further comprising:
    changing a first rotor tip path plane of a first engine in a first direction; and
    changing a second rotor tip path plane of a second engine in a second direction.

13. The method of claim 12, wherein a first nacelle is pivoted in an opposite direction to a second nacelle.

14. The method of claim 12, wherein a first nacelle is pivoted in a similar direction to a second nacelle.

15. The method of claim 11, further comprising limiting a pivot angle of the nacelle relative to the wing.

* * * * *